United States Patent
Engh-Halstvedt et al.

(10) Patent No.: US 11,030,783 B1
(45) Date of Patent: Jun. 8, 2021

(54) HIDDEN SURFACE REMOVAL IN GRAPHICS PROCESSING SYSTEMS

(71) Applicant: Arm Limited, Cambridge (GB)

(72) Inventors: Andreas Due Engh-Halstvedt, Trondheim (NO); Alexander Eugene Chalfin, Mountain View, CA (US); Frode Heggelund, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/748,712

(22) Filed: Jan. 21, 2020

(51) Int. Cl.
*G06T 11/40* (2006.01)
*G06T 15/00* (2011.01)
*G06T 1/60* (2006.01)
*G06T 1/20* (2006.01)
*G06T 15/40* (2011.01)

(52) U.S. Cl.
CPC ............... *G06T 11/40* (2013.01); *G06T 1/20* (2013.01); *G06T 1/60* (2013.01); *G06T 15/005* (2013.01); *G06T 15/40* (2013.01)

(58) Field of Classification Search
None
See application file for complete search history.

(56) References Cited

U.S. PATENT DOCUMENTS

| | | | |
|---|---|---|---|
| 7,920,139 B2 | 4/2011 | Nystad | |
| 8,289,318 B1 | 10/2012 | Hadap et al. | |
| 9,558,585 B2 | 1/2017 | Nystad | |
| 9,805,447 B2 | 10/2017 | Engh-Halstvedt | |
| 10,043,306 B2 | 8/2018 | Isomaki | |
| 10,147,202 B2 | 12/2018 | Nystad | |
| 10,510,182 B2* | 12/2019 | Broadhurst | G06T 15/005 |
| 10,540,808 B2* | 1/2020 | Andersson | G06T 15/005 |
| 2004/0174379 A1 | 9/2004 | Collodi | |
| 2005/0225670 A1 | 10/2005 | Wexler et al. | |
| 2006/0232598 A1 | 10/2006 | Barenbrug et al. | |
| 2010/0110102 A1 | 5/2010 | Nystad | |
| 2013/0141445 A1 | 6/2013 | Engh-Halstvedt et al. | |
| 2013/0293565 A1 | 11/2013 | Arvo | |

(Continued)

OTHER PUBLICATIONS

Wexler, Daniel, et al. "GPU-accelerated high-quality hidden surface removal." Proceedings of the ACM Siggraph/Eurographics conference on Graphics hardware. 2005. (Year: 2005).*

(Continued)

*Primary Examiner* — Nurun N Flora
(74) *Attorney, Agent, or Firm* — Vierra Magen Marcus LLP

(57) ABSTRACT

A graphics processor that performs early depth tests for primitives in respect of patches of a render output, and depth tests for sampling positions of the render output, maintains a per patch depth buffer that stores depth values for patches for use by the patch early depth test and a per sample depth buffer. When processing of a render output is stopped before the render output is finished, the per sample depth values in the per sample depth buffer are written to storage so that those values can be restored, but the per patch depth value information in the per patch depth buffer is discarded. Then, when processing of the render output is resumed, the per sample depth buffer values are loaded into a per sample depth buffer, and the loaded per sample depth buffer values are also used to restore the per patch depth buffer.

21 Claims, 4 Drawing Sheets

(56) References Cited

U.S. PATENT DOCUMENTS

| | | |
|---|---|---|
| 2014/0267258 A1* | 9/2014 | Yang .................. G06T 15/405 |
| | | 345/422 |
| 2014/0267283 A1 | 9/2014 | Nystad et al. |
| 2014/0267377 A1 | 9/2014 | Halstvedt et al. |
| 2014/0354654 A1* | 12/2014 | Heggelund ............ G06T 15/40 |
| | | 345/501 |
| 2015/0054845 A1 | 2/2015 | Makarov et al. |
| 2015/0062142 A1 | 3/2015 | Goel et al. |
| 2015/0103087 A1 | 4/2015 | Rouet et al. |
| 2015/0109313 A1* | 4/2015 | Heggelund ............ G06T 11/40 |
| | | 345/522 |
| 2015/0138228 A1 | 5/2015 | Lum et al. |
| 2016/0035129 A1 | 2/2016 | Bolz et al. |
| 2016/0247310 A1 | 8/2016 | Hui et al. |
| 2017/0272722 A1 | 9/2017 | Salvi |
| 2018/0068640 A1 | 3/2018 | Martin |
| 2018/0182066 A1 | 6/2018 | Saleh et al. |
| 2019/0066356 A1* | 2/2019 | Gierach ................. G06T 15/40 |
| 2019/0080504 A1 | 3/2019 | Fielding et al. |
| 2019/0147296 A1 | 5/2019 | Vvang et al. |
| 2019/0347757 A1 | 11/2019 | Selvik et al. |
| 2020/0184933 A1 | 6/2020 | Nijs et al. |

OTHER PUBLICATIONS

Chalfin, et al., U.S. Appl. No. 16/748,721, titled "Graphics Processing Systems," filed Jan. 21, 2020.
Bratt, et al., U.S. Appl. No. 16/697,984, titled "Graphics Processing Systems," filed Nov. 27, 2019.
Notice of Allowance dated Apr. 21, 2021, U.S. Appl. No. 16/748,721.

\* cited by examiner

HIDDEN SURFACE REMOVAL IN GRAPHICS PROCESSING SYSTEMS

BACKGROUND

The technology described herein relates to the processing of computer graphics, and in particular to hidden surface removal in graphics processing.

Graphics processing is normally carried out by first dividing the graphics processing (render) output, such as a frame to be displayed, into a number of similar basic components (so-called "primitives") to allow the graphics processing operations to be more easily carried out. These "primitives" are usually in the form of simple polygons, such as triangles.

The primitives for an output such as a frame to be displayed are usually generated by the driver for the graphics processor, based on the graphics drawing instructions (requests) received from the application (e.g. game) that requires the graphics processing.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates), e.g. for display.

Once primitives and their vertices have been generated and defined, they can be processed by the graphics processor, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve applying textures, blending sample point data values, etc.

(In graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

Some graphics processing systems use so-called "tile-based" or "deferred" rendering. In tile-based rendering, rather than the entire render output, e.g., frame, effectively being processed in one go, the render output, e.g., frame to be displayed, is divided into a plurality of smaller area regions, usually referred to as "tiles". Each tile (region) is rendered separately (typically one-after-another), and the rendered tiles (sub-regions) are then recombined to provide the complete render output, e.g., frame for display. In such arrangements, the render output is typically divided (by area) into regularly-sized and shaped rendering regions (tiles) (which are usually, e.g., squares or rectangles), but this is not essential.

(Other terms that are commonly used for "tiling" and "tile-based" rendering include "chunking" (the rendering tiles are referred to as "chunks") and "bucket" rendering. The terms "tile" and "tiling" will be used herein for convenience, but it should be understood that these terms are intended to cover all alternatives and equivalent terms and techniques wherein the render output is rendered as a plurality of smaller area regions.)

One issue for current graphics processing systems is that because primitives are processed sequentially, and typically not in perfect front-to-back order, a given sampling point (and hence fragment and pixel) may be shaded multiple-times as an output is processed, e.g. for display. This occurs when a first received and rendered primitive is subsequently covered by a later primitive, such that the rendered first primitive is not in fact seen at the pixel(s) (and sampling point(s)) in question. Primitives can be overwritten many times in this manner and this can lead to multiple, ultimately redundant, rendering operations being carried out for each render output, e.g. frame, being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as render outputs, such as frames to be rendered, become larger and more complex (as there will be more surfaces in the potentially-visible view), and as the use of programmable fragment shading increases.

In order to try to reduce the amount of "overdraw", the Applicants have previously proposed, e.g. in their U.S. Pat. No. 9,558,585 (which is incorporated herein by reference in its entirety), performing some form of early depth (Z) testing before a primitive and/or fragment is sent for rendering, to see if the primitive or fragment etc., will be obscured by a primitive that has already been rendered (in which case the new fragment and/or primitive need not be rendered).

These arrangements try to identify, e.g., sampling points for a new primitive that will be occluded by already processed primitives (and therefore that do not need processing) before the later sampling points are issued to the rendering pipeline. In these arrangements, the depth value, e.g., of a new primitive to be processed at the sampling positions in question is compared to the depth values for those sampling positions for the current "output" primitive(s) at those sampling positions, to see if the new primitive is occluded at the sampling positions in question or not. This can help to avoid sending fragments that are occluded by already processed primitives through the rendering pipeline.

The Applicants believe that there remains scope for improvements when performing hidden surface removal in graphics processing systems.

BRIEF DESCRIPTION OF THE DRAWINGS

A number of embodiments of the technology described herein will now be described by way of example only and with reference to the accompanying drawings, in which.

Like reference numerals are used for like features and components in the Figures, where appropriate.

DETAILED DESCRIPTION

Figure 1:
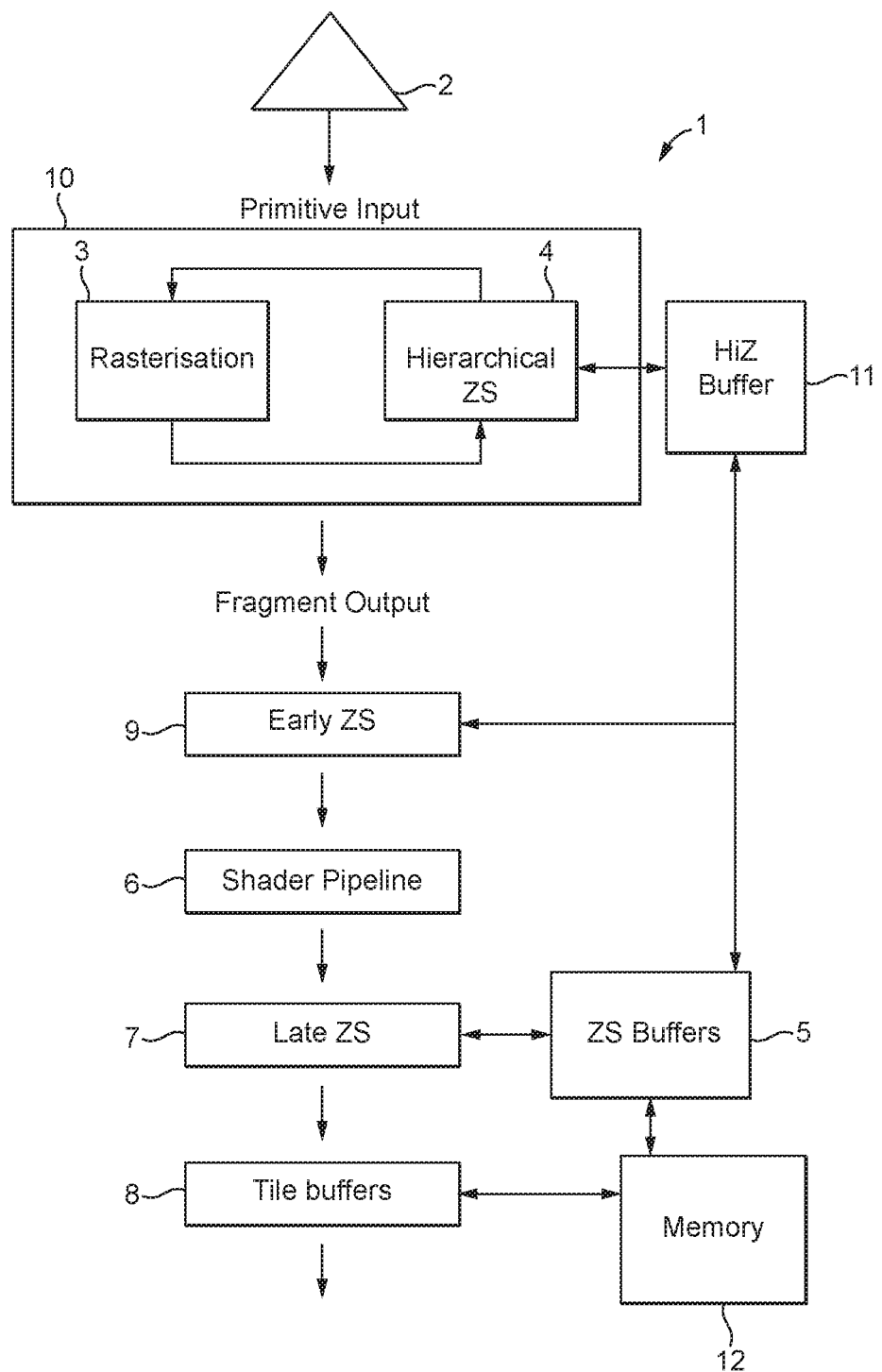
FIG. 1 shows schematically an embodiment of a graphics processor that can operate in accordance with the technology described herein.

A first embodiment of the technology described herein comprises a method of operating a graphics processor, the graphics processor comprising:

a rasteriser that rasterises input primitives to generate graphics fragments to be processed, each graphics fragment having one or more sampling points associated with it; and a renderer that processes fragments generated by the rasteriser to generate output fragment data;

wherein the rasteriser, when it receives a primitive to be rasterised, for each of one or more patches representing respective different regions of a render output to be generated, tests the patch against the primitive to determine if the primitive at least partially covers the patch;

the graphics processor further comprising:

a patch early depth test circuit configured to perform an early depth test for a primitive in respect of a patch of a render output that the primitive has been found by the rasteriser at least partially to cover; and a sample depth test circuit configured to perform depth tests for sampling positions that have been found to be covered by a primitive;

the method comprising, when processing primitives to generate a render output:

storing a per patch depth buffer for the render output, that stores for each of one or more patches representing respective different regions of the render output being generated, depth value information for the patch for use by the patch early depth test circuit when performing a patch early depth test for a primitive in respect of the patch; and storing a per sample depth buffer for the render output, that stores a depth value for each of one or more sampling positions of the render output being generated for use by the sample depth test circuit when performing a depth test for a primitive in respect of a sampling position of the render output being generated;

the method further comprising:

the graphics processor stopping processing the render output, and when it does so:

writing the per sample depth values in the per sample depth buffer to storage so that those values can be restored when continuing processing of the render output, but discarding the per patch depth value information in the per patch depth buffer;

and the graphics processor resuming processing of the render output; and when it does so:

loading the per sample depth buffer values written out to storage into a per sample depth buffer for use when continuing processing of the render output; and using the loaded per sample depth buffer values to store a set of per patch depth value information in a per patch depth buffer for use by the patch early depth test circuit when performing patch early depth tests for primitives when continuing processing of the render output.

A second embodiment of the technology described herein comprises a graphics processor, the graphics processor comprising:

a rasteriser that rasterises input primitives to generate graphics fragments to be processed, each graphics fragment having one or more sampling points associated with it; and a renderer that processes fragments generated by the rasteriser to generate output fragment data;

wherein the rasteriser is configured to, when it receives a primitive to be rasterised, for each of one or more patches representing respective different regions of a render output to be generated, test the patch against the primitive to determine if the primitive at least partially covers the patch;

the graphics processor further comprising:

a patch early depth test circuit configured to perform an early depth test for a primitive in respect of a patch of a render output that the primitive has been found by the rasteriser at least partially to cover; and a sample depth test circuit configured to perform depth tests for sampling positions that have been found to be covered by a primitive;

the graphics processor being further configured to, when processing primitives to generate a render output:

store a per patch depth buffer for the render output, that stores for each of one or more patches representing respective different regions of the render output being generated, depth value information for the patch for use by the patch early depth test circuit when performing a patch early depth test for a primitive in respect of the patch; and store a per sample depth buffer for the render output, that stores a depth value for each of one or more sampling positions of the render output being generated for use by the sample depth test circuit when performing a depth test for a primitive in respect of a sampling position of the render output being generated;

the graphics processor further configured to, when it stops processing a render output before the render output has been completed:

write the per sample depth values in the per sample depth buffer to storage so that those values can be restored when continuing processing of the render output, but discard the per patch depth value information in the per patch depth buffer; and the graphics processor further configured to, when it resumes processing of a previously stopped render output:

load the per sample depth buffer values for the render output written out to storage into a per sample depth buffer for use when continuing processing of the render output; and use the loaded per sample depth buffer values to store a set of per patch depth value information in a per patch depth buffer for use by the patch early depth test circuit when performing patch early depth tests for primitives when continuing processing of the render output.

The technology described herein relates to a graphics processor in which primitives to be rendered are subjected to an early depth test in respect of patches representing regions of the output being rendered, as well as individual sampling positions for primitives being subjected to a per sampling position depth test.

To support these two different depth test operations, when generating a render output, both a "per-patch" depth buffer that stores appropriate depth value information for the patches representing regions of the render output that the early per-patch depth test may be performed in respect of, and a per-sampling position depth buffer that stores depth values for each sampling position of the render output being generated, are maintained.

The technology described herein relates in particular to the situation where the generation of a render output may be stopped, to be resumed at a later time (e.g. because there is a need to switch to processing another render output, and/or further data needs to be generated and/or provided to allow more of the render output to be processed).

In the technology described herein, when it is desired to pause the generation of a render output, the per-sample depth buffer is written out to storage (e.g. memory), so that that per-sample depth buffer can be restored when the generation of render output is resumed.

On the other hand, rather than also writing the per-patch depth buffer to storage, the per-patch depth buffer is instead simply discarded (is not written to storage (e.g. memory)).

Then, when the processing of the render output is to be recommenced, the per-sample depth buffer is restored using the per-sample depth values stored to the storage, and a new version of the per-patch depth buffer for use when continuing processing the render output is generated using the restored (previously stored) per-sample depth values.

The Applicants have recognised in this regard that it can be the case that processing of a given render output may need to be halted and resumed when performing graphics processing. For example, in the case where there is limited storage set aside for the data structures needed to process a render output, it may be that that storage is filled before the complete data structures for the render output have been generated. In that case, it may then be desirable to process the existing data structures for the render output (so as to, in effect, "flush" those data structures from the storage), and to then generate new data structures for the render output in question, and so on. In this case therefore, the render output being generated may, e.g., be generated as a sequence of "incremental" processing, where a first part of the data for the render output is processed, followed by a pause and/or the processing of some other render output, before the initial render output is returned to for completion (or at least continuing its processing).

This could arise, for example, in a tile-based graphics processing system, where the processing of one tile may be halted to then switch to processing the another tile and so on, with the processing alternating between different tiles, e.g. as the data structures for the different tiles are generated and consumed.

The Applicants have further recognised that where a given render output may only be partially processed, such that processing of that render output will need to be resumed at a later time, then data structures generated as part of the processing of the render output to date may need to be retained so that they can then be reused and continued with when processing of the render output in question is resumed.

The Applicants have further recognised that one aspect of this would be that where the render output is partially processed, and it is desired to continue processing of that render output at a later date, then it would be desirable to retain the depth values from the partial processing of the render output for use when the processing of the render output is resumed. The technology described herein addresses this by, when processing of a render output that is only partially completed is stopped, storing depth values produced from the partial processing of the render output out to storage, so that those depth values can then be restored when processing of the render output is resumed.

However, in the technology described herein, rather than simply saving all the depth values that have been produced to date, both for the per-sample and per-patch depth tests, the technology described herein simply writes out the per-sample depth values, and, instead, uses those per-sample depth values to also restore per-patch depth values when processing of the render output is resumed.

The Applicants have recognised in this regard that it can and would be possible to restore per-patch depth values from the per-sample depth values, and in a sufficiently efficient manner, such that writing out the per-patch depth values for later (re-)use can be omitted. This then has the advantage of reducing the storage requirements and memory bandwidth, etc., required when halting processing of a render output partway through, thereby making the overall process more efficient.

The graphics processor of the technology described herein includes a rasteriser, a renderer, and per-patch, and per-sampling position, depth tests.

The rasteriser (rasteriser circuit) can be configured to operate in any suitable and desired manner, for example as in known rasterising arrangements. It should operate to generate graphics fragments for processing in dependence upon which sampling points (or which sets of sampling points) of an array of sampling points covering the area of the render output, a given primitive, etc., received by the rasteriser covers (at least in part).

The rasteriser in an embodiment generates a graphics fragment for each sampling point covered by, and/or for each set of plural sampling points (e.g., sampling mask) found to include a sampling point that is covered by, the (and each) primitive being rasterised (and that is not otherwise culled from processing for another reason, such as by the primitive failing the early depth test). Correspondingly, each fragment generated by the rasteriser may represent (have associated with it) a single sampling point, or plural sampling points, as desired. In an embodiment, each fragment represents a set of plural, in an embodiment a set of four (and in an embodiment a 2×2 array of), sampling points.

In the technology described herein, the rasteriser operates to determine whether a primitive being rasterised covers, at least in part, respective patches of the render output to be generated. In this regard, the rasteriser could simply test a single set of patches that the render output is divided into. However, in an embodiment, the rasteriser is a hierarchical rasteriser that operates to iteratively test primitives against progressively smaller patches of the render output (of sampling positions) down to a given, in an embodiment selected, in an embodiment predetermined, minimum patch size, discarding any patches that are not covered at least in part by the primitive, and then generates a fragment or fragments for rendering corresponding to the patch or patches of sampling positions found to be covered at least in part by the primitive (and that pass the early depth test(s)).

The rasteriser can test the primitives against the patches of the render output in any suitable and desired manner to determine if a primitive covers a patch (at least in part). For example, edge equations for the primitive's edges could be derived, and then tested against the patches of the render output, to see if the patches are covered by the primitive or not.

The renderer (renderer circuit) of the graphics processor should be operable to render (shade) graphics fragments it receives to generate the desired output graphics fragment data. It may contain any suitable and desired rendering elements and may be configured in any suitable and desired manner. Thus, for example, it may comprise a fixed function rendering pipeline, including one or more fixed function rendering stages (circuits), such as texture mappers, blenders, fogging units, etc. In an embodiment the renderer comprises a fragment shader (a shader pipeline) (i.e. a programmable processing circuit that is operable to and that can be programmed to carry out fragment shading programs on fragments in order to render them).

The renderer will process the fragments it receives to then generate output rendered fragment data, which rendered fragment data is then in an embodiment written to an output buffer, such as a frame buffer, in external memory, for use (e.g. to display a frame on a display). The rendered fragment data may be written to the (external) output buffer via an intermediate buffer, such as a tile buffer (as will be the case in a tile-based graphics processing system).

The per-patch depth test of the technology described herein comprises an "early" depth test, i.e. one that is performed before rendering (before fragments are sent to the renderer for processing).

The sampling point depth test (and for which the per-sampling point depth buffer is maintained) may also be an "early" depth test, or it may be a "late" depth test, i.e. that is performed after rendering (after the fragments have been rendered) (and, e.g., and in an embodiment, as a final check to determine whether to store a rendered sampling position for a primitive as part of the render output or not).

In an embodiment, the graphics processor performs and comprises both an "early" per-sample depth test and a "late" per-sample depth test. The graphics processor may be configured, for any given render output, primitive sampling point, etc., to only perform one or other of the early and late per-sample depth tests, or to perform both an early and a late per-sample depth test, as desired.

In the case where the graphics processor performs both early and late per-sample depth tests, then those early and late per-sample depth tests in an embodiment both share (use in common) (and update in common) the same per-sample depth buffer (i.e. there is not a separate "early" per-sample depth buffer and a separate "late" per-sample depth buffer).

Thus, in an embodiment, the graphics processor includes both an early depth test that tests patches of a render output, followed by an early depth test that tests individual sampling points, and in an embodiment also includes a late depth test that tests individual sampling points.

The early depth test or tests may be implemented, e.g., as part of the rasteriser, or after the rasteriser (but before the renderer), or as a combination of this (e.g. where there is more than one early depth test). In an embodiment it or they are implemented as part of the rasterisation process and/or after the rasteriser but before the rest of the graphics processing pipeline that the graphics processor executes. Thus, in an embodiment, the rasteriser and rasterisation process is configured to also perform the early depth (Z) testing on the patches of the render output that it is testing against a primitive (to see if the patches of the render output can be discarded from further processing on the basis of the early depth test).

The render output to be generated (and that is divided into patches, etc.) may comprise any render output that is to be generated by the graphics processor. Thus it may comprise, for example, a tile to be generated in a tile-based graphics processor, and/or all or part of a frame of output fragment data.

In an embodiment, the render output being generated is a tile (a region) of an overall output (such as a frame to be displayed) that is being generated by the graphics processor (and thus the graphics processor is a tile-based graphics processor).

The Applicants have recognised in this regard that in tile-based graphics processing systems, it may be desirable to switch from processing one tile to processing another tile or tiles, before returning to continue processing an earlier tile, and so on. This could arise, for example, where there are restrictions on the amount of storage that can be used for the tile data structures to be used when rendering tiles, such that, for example, it may be desirable to process a tile for which the relevant data structures have only been partially completed, so as to free up the memory space that is occupied by those data structures. However, that will mean that the tile has only partially been processed, and so it may then be necessary to resume processing of the tile at a later time, for example when new data structures containing new data that was not previously processed for the tile have been generated, and so on.

The patches that the render output is divided into for the rasterisation and early per-patch depth test process can be selected as desired. The patches that the (per-patch) early depth test is performed in respect of in an embodiment correspond to the patches of the render output that the rasteriser tests for the rasterisation process.

The patches in an embodiment all have the same shape, and in an embodiment cover (encompass) a regularly shaped area of the render output. The patches are in an embodiment rectangular (including squares). In an embodiment, the patches are square.

The patches in an embodiment each correspond to a plurality of sampling positions of the render output to be generated. In an embodiment, the patches that the (per-patch) depth test considers comprise patches (sets) of plural fragments. For example, where the rasteriser can rasterise primitives into patches of plural fragments, such patches could then be subject as a whole to the (per-patch) (early) depth test. Thus, in an embodiment the (per-patch) early depth test tests patches (sets) of plural fragments.

In an embodiment, there are multiple (hierarchical) levels of patches that can be depth tested, with each patch level containing smaller patches than the preceding, higher, larger patch level. In an embodiment each larger patch of the render output is divided into (encompasses) a respective set of plural smaller patches of the render output (which set may contain any desired (plural) number of smaller patches of the render output). Each set of plural smaller patches that a given larger, higher level patch encompasses in an embodiment comprises an integer number of plural smaller patches. In an embodiment, each larger patch is divided into a set of four smaller patches for the depth test process. In an embodiment, each larger patch is divided into (encompasses) a 2×2 set (array) of smaller patches.

Thus, in an embodiment, the patches are arranged such that a (and each) larger patch encompasses (and will accordingly be subdivided into) a set four smaller patches, with each smaller patch being a quarter of the size of the larger patch. Varying the patch sizes by a factor of 4 in each successive subdivision level is a particularly a convenient arrangement for progressively decreasing the patch size as the rasterisation and depth test process proceeds. However, it is not essential and other arrangements could be used if desired.

Each patch (within a given level of patches) should (and in an embodiment does) represent a respective different region (area) of the render output to be generated.

Each patch of the render output that is tested in an embodiment corresponds to an integer number of fragments, such as 16×16, 8×8, 4×4 and/or 2×2 fragments. In an embodiment, the largest patches each correspond to 16×16 fragments, with the next smaller second level patches being 8×8 fragments, and the third level, smaller patches being 4×4 fragments (and so on, if desired).

In an embodiment, all the patches at given subdivision level have the same size, and in an embodiment also the same shape, as each other (i.e. in an embodiment cover the same number of sampling positions of the render output).

In the technology described herein both a per-patch depth buffer and a per-sample depth buffer are maintained when generating render outputs. These depth buffers should be stored in appropriate (local) storage of and/or accessible to the graphics processor, such as, and in an embodiment, a (local) RAM of or associated with the graphics processor. The buffers could be stored in different physical memory, but are in an embodiment stored in the same physical storage.

The per sample depth buffer stores depth values to be used for the per-sample depth tests and can be configured in any appropriate and desired manner. It should, and in an embodiment does, store a depth value for each sampling position of the render output (e.g. tile) that is being generated. Thus the per sample depth buffer should, and in an embodiment does, store a current depth value for each sampling position within the render output (that can then be compared with the depth value for a later primitive that covers the sampling position in question (and that is to be subjected to a per-sample depth test)). The depth values stored in the per-sample depth buffer should be, and are in an embodiment, stored and updated as primitives and sampling positions are processed and depth tested for the render output being generated.

The per-sample depth test can be performed using the per-sample depth values stored in the per-sample depth buffer in any suitable and desired manner, such as, and in an embodiment, in accordance with the normal operation for such per-sample depth tests in the graphics processor and graphics processing system in question. Thus, a depth value of a sampling position associated with a primitive is in an embodiment compared to the current depth value for the sampling position in the per-sample depth buffer, to see if the new primitive is occluded at the sampling position or not.

The depth test is in an embodiment performed in an appropriately conservative fashion, so as to avoid the risk of any errors.

Correspondingly, the outcome of the depth test for a sampling position is in an embodiment either that the new primitive passes the test for the sampling position (and so is sent onwards in the pipeline for processing in respect of the sampling position), or that the primitive fails the depth test at the sampling position in question (in which case the primitive is in an embodiment discarded in respect of the sampling position in question (is not processed further for the render output sampling position in question).

Correspondingly, if a primitive being tested against a sampling position passes the per-sample depth test, then in an embodiment the depth value stored for the sampling position in question is updated (as appropriate) to take account of the new primitive. This updating is in an embodiment carried out in an appropriately conservative fashion, so as to avoid any risk that the updates could cause errors in the processing of future primitives, etc.

The per-patch depth buffer stores depth value information for patches to be used for the per-patch early depth tests, and can correspondingly be configured in any appropriate and desired manner. It should, and in an embodiment does, store depth value information for each patch of the render output that is being generated that a per-patch depth test could be performed for.

Thus, the per-patch depth buffer should, and in an embodiment does, store depth value information for a (and each) patch that a per-patch depth test can be performed for (and, in particular, and in an embodiment, for each patch that the rasteriser can test against a primitive). Thus the per-patch depth buffer will in an embodiment have an entry for each patch of the render output that would be considered when generating the render output. Thus, in the case, where there is a single level of patches that are used for the rasterisation and per-patch early depth test process, there will be a set of entries in the per-patch depth buffer corresponding to the patches of that layer.

Correspondingly, in the case where the rasteriser and the per-patch early depth test operate in a hierarchical manner, the per-patch depth buffer in an embodiment correspondingly stores a hierarchical set of depth value information for the hierarchical arrangement of patches. Thus it will, for example, and in an embodiment, store appropriate depth value information for each "largest" patch that can be considered, and then also store depth value information for each smaller patch within a larger patch, and so on.

The depth value information stored in the per-patch depth buffer should be, and is in an embodiment, stored and updated as primitives are processed and depth tested for the render output being generated.

Thus the per-patch depth buffer should, and in an embodiment does, store current depth value information for each patch within the render output (that can then be used to perform a per-patch depth test for a later primitive that at least in part covers the patch in question).

The depth value information that is stored for a (and each) patch for use by the patch early depth test circuit when performing a patch early depth test for a primitive in respect of a patch can comprise any suitable and desired depth value information that can be used for this purpose. In an embodiment, the depth value information for a patch allows a depth value or values to be used for the patch for the patch early depth test to be determined. Thus the depth value information for a patch in an embodiment indicates, and in an embodiment comprises, a depth value or values to be used for the patch.

The depth values for a (and each) patch stored in the per-patch depth buffer can be indicated and represented as desired.

For example, the depth values for a patch could be represented by using a functional representation of the depth values (a function to represent the depth values), such as a layer function (a plane function) that describes the depth values within the patch in question.

However, in an embodiment, the patch depth values are represented as a range of depth values, and in an embodiment as a minimum depth value and a maximum depth value, to be used for the patch in question. (Correspondingly, in an embodiment, the patch depth test uses ranges of depth values for the patches of the render output.)

Representing the per-patch depth values as a range of depth values (as minimum and maximum depth values for the patch) facilitates repopulating (restoring) the per-patch depth buffer using the per-sample depth buffer values when resuming the processing of a render output.

A depth value range or ranges is accordingly in an embodiment stored for some, and in an embodiment for all, of the patches of the render output that may be considered (early depth tested). In this case, a minimum depth value and a maximum depth value is in an embodiment stored and used for a (and each) patch.

In this case therefore, where the per-patch early depth test is performed for a hierarchical configuration of patches, a depth value range would be stored for each "largest" patch to be considered for the render output, together with a depth value range for any smaller patches within a larger patch (which depth value ranges for the smaller patches will be within the range for their "parent" larger patch).

The per-patch early depth test of a primitive against a patch (against the depth values for a patch) can be performed in any suitable and desired manner. The test is in an embodiment carried out only for patches of the render output that have been found by the rasterisation process to be at least partially covered by the primitive in question.

Thus, in an embodiment, a depth value or values associated with the new primitive being processed is compared to the current depth value or values for the patch of the render output to see if the new primitive is occluded or not. In an embodiment, this is done by deriving appropriate depth values for respective sampling positions within the patch in question. In an embodiment the sampling positions correspond to a grid of selected sampling positions within the patch, e.g. to respective corners of the patch in question.

For the primitive, the depth values at the patch sampling point positions can be determined, e.g. and in an embodiment, using the depth function for the primitive.

For the patch, the depth values to be used should be, and are in an embodiment, determined in accordance with (and based on) the depth value information that is stored for the patch. Thus, where the patch depth values are represented as a range of depth values (minimum and maximum depth values), then each patch sampling position is in an embodiment allocated the respective minimum and maximum depth value, and two depth tests, one against the minimum depth value at each patch position and one against the maximum depth value at each patch sampling position, are carried out.

Other arrangements would, of course, be possible.

The depth tests themselves can be carried out in any suitable and desired manner using the depth values for the determined relevant positions of the primitive and the patch being considered, e.g., in the normal manner for the graphics processor and graphics processing system in question. They are in an embodiment carried out in an appropriately conservative manner.

The outcome of the depth test for a patch is in an embodiment either that the primitive (fully or partially) passes the test (and so is sent onwards in the pipeline for processing in respect of the area of the patch that it covers), or that the primitive completely fails the depth test across the area of the patch that it covers (in which case the primitive is in an embodiment discarded in respect of the render output area that the patch corresponds to (is not processed further for the render output area in question).)

If the primitive being tested against a patch partially or fully passes the per-patch depth test, then in an embodiment the depth value information stored for (associated with) the patch is updated (as appropriate) to take account of the new primitive. This updating is in an embodiment carried out in an appropriately conservative fashion, so as to avoid any risk that the updates could cause errors in the processing of future primitives, etc.

Thus, if the patch early depth test is passed, the per-patch depth buffer entry for the patch (and for any associated (overlapping) patches) is in an embodiment updated as well, e.g., and in an embodiment, with (based on) the relevant depth value(s), associated with the primitive that passed the early depth test.

The technology described herein relates in particular to the situation where a render output, such as a tile of a frame being generated by the graphics processor, has only been partially processed (is not yet finished), and the processing of that render output (e.g. tile) is to be stopped (e.g. so that another render output (e.g. tile from the frame) can be processed instead). As discussed above, this situation may arise where there are constraints on the amount of data that can be stored for a render output before the data needs to be processed to free-up new space for new data for the render output.

Thus, in the technology described herein, the processing of a render output will be stopped for some reason (but not be finished) (be only partially completed). At that point, there will exist for the render output both a per-sample depth buffer storing (to date) per-sample depth values for the render output, and a per-patch depth buffer storing (to date) per-patch depth information (values) for the render output.

In accordance with the technology described herein, when the processing of the render output is stopped (but is incomplete and so is to be resumed), the per-sample depth buffer is written out to storage so that it can be restored when processing of the render output is resumed. However, the per-patch depth buffer information (values) is not written out to storage (e.g. memory), but is simply discarded.

The stopping of the processing of a render output to thereby trigger the storing out of the per-sample depth buffer (but not the per-patch depth buffer) can be triggered in any suitable and desired way.

For example, this may be triggered by the current data structures for the render output being processed being exhausted. For example, in the case of a tile-based graphics processing system, various data structures will be prepared for a tile to allow the tile to be generated. It may be that the data structures for a tile are not completed (do not contain all the data needed to process the tile completely) when the graphics processor is triggered to process the tile. In that case therefore, the graphics processor will process the (incomplete) data structures for the tile that it receives, but when it has finished those data structures, it will then need to wait for new data structures containing further data for the tile to be available (to be processed) before processing of the tile can be continued.

It may also be triggered, e.g., where the graphics processor needs to switch to producing a different overall render output (e.g. frame). This could arise, e.g., in the case of a context switch for Virtual Reality time warp operation, e.g. where "time warp" frames are rendered at the full frame rate (e.g. 60 fps), and the full frames for the VR application are rendered during the off-cycle of the "time warp", and are then pre-empted for time warp processing as needed. A partial frame will then be encountered when pre-emption occurs. This operation could also be triggered due to interaction with other data, such as a geometry cache, e.g. where it is desired to keep geometry in the cache at the expense of pixel traffic.

When the processing of the render output in question is stopped, to thereby trigger the writing-out of the per-sample depth buffer values to storage, the per-sample depth buffer values are written out to storage. That can be done in any appropriate and desired manner, e.g., and in an embodiment, in the normal manner for the graphics processor and graphics processing system in question.

Correspondingly the storage that the per-sample depth buffer values are written to can be any suitable and desired storage of or available to the graphics processor (and of the graphics processing system). The storage is in an embodiment an appropriate memory (main memory) of or available to the graphics processor, e.g. that is part of the overall graphics processing system (data processing system) that the graphics processor is part of. Thus, in an embodiment, the per-sample depth values from the per-sample depth buffer are written out to appropriate DRAM (or other main memory) of the overall graphics (data) processing system. Other arrangements would, of course, be possible.

As well as the per-sample depth buffer, any other data structures that will need to be restored when resuming processing of the render output, such as the colour buffer (tile buffer) corresponding to the overall output of the graphics processing, a multi-sample buffer or buffers, are in an embodiment also appropriately written out to storage when processing of the render output is stopped before the render output is finished.

Once the graphics processor has stopped processing the render output in question (and the data structure(s) have been written out to storage), then the graphics processor may perform other processing, such as some or all of the processing for another render output (such as for a different tile of the frame).

Then, at a later point in time, the graphics processor will be triggered to resume processing of the render output that was only partially completed. Again, this resuming of processing of the render output may be triggered as desired, for example by there being new data structures containing new data for the render output (e.g. tile) in question that are now ready to be processed, by a context switch for VR time warp, etc.

When resuming processing of the render output region, the graphics processor recreates (restores) a per-sample depth buffer and a per-patch depth buffer for the render output, so that those buffers can be used when continuing the processing of the render output.

In the case of the per-sample depth buffer, that can be, and is in an embodiment, done by loading the saved per-sample depth buffer values back into a depth buffer for use when continuing processing of the render output. This will accordingly recreate a per sample depth buffer in its state when the processing of the render output was stopped.

A per-patch depth buffer is also created (restored) from the per-sample depth values that were previously saved and that are loaded back in to repopulate the per-sample depth buffer.

The previously saved per-sample depth values can be used to create a per-patch depth buffer for use when continuing the processing of the render output in any suitable and desired manner.

In an embodiment appropriate patch depth information (a patch depth value or values) is generated and stored in a per-patch depth buffer to be used when continuing processing of the render output, for each patch that the per-patch depth buffer stores a value for, using (based on) the per-sample depth values. In an embodiment, all the per-sample depth values falling within a patch are considered when generating the depth value information (the depth value or values) that is stored for the patch in the recreated per-patch depth buffer.

Where the per-patch depth further stores a range of depth values (a minimum and a maximum depth value) for each patch, then each patch entry within the per patch depth buffer could, e.g., be set to a default maximum depth value for the patch, with the minimum depth value for the patch then being set to the minimum depth value of any per-sample depth value that has been restored to the per-sample depth buffer that falls within the patch in question, or, correspondingly, each patch entry within the per patch depth buffer could be set to a default minimum depth value for the patch, with the maximum depth value for the patch then being set to the maximum depth value of any per-sample depth value that has been restored to the per-sample depth buffer that falls within the patch in question.

In an embodiment, where the per-patch depth buffer stores a range of depth values (a maximum and a minimum depth value) for each patch, the minimum depth value for a patch in the restored per-patch depth buffer is set to the minimum of the per-sample depth values that have been restored to the per-sample depth buffer for the sampling positions that fall within the patch, and, correspondingly, the maximum depth value for the patch is set to the maximum of the per-sample depth values that have been restored to the per-sample depth buffer for the sampling positions that fall within the patch.

To facilitate this operation, the per-patch depth buffer restoration operation in an embodiment scans all the per-sample depth values for a patch and sets the depth value(s) for the patch accordingly.

In an embodiment, each per-sample depth value for a patch is read in, in an embodiment in turn, and compared to the current maximum and minimum depth buffer values that have been set for the patch, with the current maximum and minimum patch depth values then being updated or not, based on the comparison, until all the sampling positions falling within the patch have been considered.

In an embodiment, the per-sample depth values that are read-in to repopulate the per-sample depth buffer are read-in using a DMA (direct memory access) process, as that will then facilitate inspecting each of the depth values as they are read in and stored in the per-sample depth buffer, to also correspondingly set the patch depth value(s) in the per-patch depth buffer. It would also be possible for a processing core (a shader core) of the graphics processor to perform the load of the depth buffer.

In an embodiment, the per-sample depth values that are read in to repopulate the per-sample depth buffer are read-in in an order that corresponds to the layout of the patches for which per-patch depth values are stored, so as to facilitate repopulating the per-patch depth buffer in a more efficient manner. Thus, in an embodiment, the per-sample depth values are read-in on a patch-by-patch basis both to repopulate the per-sample depth buffer and to repopulate the per-patch depth buffer (i.e. such that all the per-sample depth values for a first patch will be read in before any samples for another patch are read in, followed by reading in all the per sample depth values for a next patch, and so on, for the patches in turn). In an embodiment, the reading in of the per-sample depth values traverses the sampling positions in the per-sample depth buffer in an order that matches the (patch) order for restoring the values in the per-patch depth buffer.

In an embodiment, the restoration of the per-patch depth buffer also takes account of, and in an embodiment indicates, where sampling positions in a patch are not covered by a primitive. Thus, for example, and in an embodiment, it is possible for a patch to encode both a range of depth values (e.g. a minimum and a maximum depth value for the patch), and an indication of which part(s) of the patch that range of depth values (the minimum and maximum depth values) applies to. Correspondingly, in an embodiment, it can be indicated for which parts within a patch depth data exists for, and for which parts in the patch no depth data exists. This can be indicated in any suitable and desired manner. The absence of any defined depth values for positions within the patch can be identified as desired, for example, and in an embodiment, based on whether the per-sample depth value for the position in the patch is indicated as not being covered by a primitive (e.g., and in an embodiment as having a particular, in an embodiment selected, in an embodiment predefined, depth "clear" value). In this case, per-sampling positions in the per-sample depth buffer having the depth clear value would then be indicated as not being covered by a primitive (and thus not having the corresponding, e.g., minimum and maximum depth values) for the patch. Thus, for example, in the case of an 8×8 patch for which only half the positions in the patch are covered by a primitive, then the per-patch depth buffer in an embodiment encodes that there is no depth data for the "uncovered" half of the patch, together with a minimum and maximum depth value for the remaining, covered, half of the patch.

In an embodiment a special value is used to mean "clear value" rather than storing a clear value into the per-patch depth buffer directly.

In an embodiment a respective bit (e.g. in the tile buffer) that can be set to indicate covered or not is used to indicate the coverage for respective sampling positions (or sets of plural sampling positions). Then, on write out, a key-value is in an embodiment encoded indicating no coverage, and use the depth clear value, as appropriate.

Other arrangements would, of course, be possible.

Where the per-patch depth buffer is configured to store depth values for a hierarchical layout of patches (as discussed above), then the per-patch depth buffer is in an embodiment appropriately repopulated from the per-sample depth buffer values across all levels of the hierarchy. In an embodiment, to facilitate this, the in-memory layout of the per-patch depth buffer is configured so as to facilitate more efficient reconstruction. Thus, in an embodiment, the per-patch depth buffer is configured to store smaller (lower level) patches in a particular, in an embodiment predefined, appropriately fixed, pattern relative to the larger patches that encompass them (so, e.g., the per-patch depth buffer will be stored with 2×2 regions in a fixed pattern relative to the largest 16×16 patch).

Correspondingly, the repopulation of the per-patch depth buffer is in an embodiment done so as to facilitate more efficient reconstruction of the hierarchical per-patch data. Thus, in an embodiment, the depth values for the smallest (e.g. 2×2) patches (in an embodiment as well as coverage), are generated, then when considering the 4×4 patches in the next level of the hierarchy, the minimum depth of the four 2×2 patches within a 4×4 patch becomes (is set to be) the minimum depth for the 4×4 patch, and the maximum depth of the four 2×2 patches becomes (is set to be) the maximum depth for the 4×4 patch. Coverage data from the underlying 2×2 patches is also propagated up to the 4×4 layer. This is then repeated for each successive higher (larger patch) layer, as appropriate.

Thus, where the per-patch depth buffer is configured to store depth values for a hierarchical layout of patches (as discussed above), then in an embodiment the per-sample depth values that are read back in are used to set and populate the per-patch depth values for the lowest level of patches (for the smallest patches in the patch subdivision hierarchy), with the per-patch depth values for the higher levels (larger patches) in the patch hierarchy then being set based on the per-patch depth values for the lower level (smaller) patches that they encompass.

Other arrangements would, of course, be possible.

As well as the depth buffers, any other data structures that are needed for continuing processing of the render output (e.g. tile), such as the current colour (tile) buffer for the render output at the time the processing of the render output was stopped, are in an embodiment correspondingly also restored from their previously saved values, as appropriate, and in the appropriate manner.

Once the depth buffers and any other data structures, such as the colour buffer (tile buffer), any multi-sample buffers, etc., for the render output whose processing is being resumed have been appropriately created (restored), then processing of the render output can be, and is in an embodiment, resumed. Thus the graphics processor, once the per-sample depth buffer values written out to storage have been loaded into a per-sample depth buffer for use when continuing the processing of the render output, and the restored per sample depth buffer values have been used to store a set of per-patch depth value information in the patch depth buffer for use by the patch early depth test circuit when performing patch early depth tests for primitives when continuing processing of the render output, the graphics processor will resume processing of primitives for the render output, including performing patch early depth tests for primitives for the render output using the depth value information for patches of the render output in the (restored) per-patch depth buffer, and performing depth tests for primitives in respect of sampling positions of the render output being generated using the depth values for sampling positions of the render output being generated in the (restored) per-sample depth buffer.

It will be appreciated from the above that in an embodiment at least, the technology described herein will involve partially processing a first render output (e.g. tile), then pausing the processing of that output while processing another render output (e.g. tile), and then resuming processing of the first render output, and so on, e.g. with repeatedly switching between processing different render outputs.

Thus, in an embodiment, the method of the technology described herein comprises (and the graphics processor is correspondingly configured to):

the graphics processor stopping processing of a first render output, and when it does so:
  writing the per sample depth values in a per sample depth buffer for the first render output to storage so that those values can be restored when continuing processing of the first render output, but discarding the per patch depth value information in a per patch depth buffer for the first render output;
the graphics processor, after stopping processing of the first render output:
processing primitives to generate a second, different render output, the processing primitives to generate a second, different render output including:
  storing a per patch depth buffer for the render output, that stores for each of one or more patches representing respective different regions of the second render output being generated, depth value information for the patch for use by the patch early depth test circuit when performing a patch early depth test for a primitive in respect of the patch; and
  storing a per sample depth buffer for the second render output, that stores a depth value for each of one or more sampling positions of the second render output being generated for use by the sample depth test circuit when performing a depth test for a primitive in respect of a sampling position of the second render output being generated; the graphics processor stopping processing of the second render output, and when it does so:
  writing the per sample depth values in the per sample depth buffer for the second render output to storage so that those values can be restored when continuing processing of the second render output, but discarding the per patch depth value information in a per patch depth buffer for the second render output;
the graphics processor, after stopping processing of the second render output:
resuming processing of the first render output; and when it does so:
  loading the per sample depth buffer values written out to storage for the first render output into a per sample depth buffer for use when continuing processing of the first render output; and
  using the loaded per sample depth buffer values to store a set of per patch depth value information in a per patch depth buffer for use by the patch early depth test circuit when performing patch early depth tests for primitives when continuing processing of the first render output.

In this case, the first and second render outputs in an embodiment comprise respective, different, tiles, of an overall render output being generated, such as of a frame to be displayed.

Correspondingly, the processing of more than two render outputs (e.g. tiles) may be interleaved in this manner. Equally, the processing of a given render output may be stopped and resumed multiple times (more than once), e.g. until the render output has been completed.

Although the technology described herein has been described above with reference to the writing out and then restoring of the depth buffers when performing graphics processing, the Applicants have recognised that the idea of constructing a per-patch depth buffer from a per-sample depth buffer in the manner of the technology described herein could also be useful in other contexts where a per-patch depth buffer is required, such as, and in particular, in the case where a "pre-computed" depth buffer may be supplied to the graphics processor (but without there being provided a corresponding "pre-computed" per-patch depth buffer).

For example, the Applicants have recognised that there can be situations where the application that requires graphics processing may provide a pre-generated (pre-computed) depth buffer for use by the graphics processor, and/or a depth buffer could be provided from a non-GPU source. In this case the per-sample depth buffer could, e.g., be produced on a CPU of the graphics processing system, or produced by the graphics processor but outside of the normal rendering process (e.g. as a prior compute pass or non-related render pass), and/or otherwise provided from mass storage or downloaded for use by the graphics processor.

In this case therefore, a pre-generated per-sample depth buffer would be provided. However, the Applicants have recognised that it could still be useful in this case to construct a per-patch depth buffer from the provided per-sample depth buffer, e.g. for use in a hierarchical depth testing process. Furthermore, the Applicants have recognised that such generation of a per-patch depth buffer from a provided per-sample depth buffer can advantageously be done in the manner of the technology described herein as discussed above.

Thus, the technology described herein also extends to the idea of restoring a per-sample per-patch buffer from a provided per-sample depth buffer in the manner discussed above.

Thus, a further embodiment of the technology described herein comprises a method of operating a graphics processor, the graphics processor comprising:
a rasteriser that rasterises input primitives to generate graphics fragments to be processed, each graphics fragment having one or more sampling points associated with it; and
a renderer that processes fragments generated by the rasteriser to generate output fragment data;
wherein the rasteriser, when it receives a primitive to be rasterised, for each of one or more patches representing respective different regions of a render output to be generated, tests the patch against the primitive to determine if the primitive at least partially covers the patch;
the graphics processor further comprising:
a patch early depth test circuit configured to perform an early depth test for a primitive in respect of a patch of a render output that the primitive has been found by the rasteriser at least partially to cover; and a sample depth test circuit configured to perform depth tests for sampling positions that have been found to be covered by a primitive;
the method comprising:
the graphics processor:
loading per sample depth buffer values into a per sample depth buffer for use when processing a render output, the per sample depth buffer storing a depth value for each of one or more sampling positions of the render output being generated for use by the sample depth test circuit when performing a depth test for a primitive in respect of a sampling position of the render output being generated; and
using the loaded per sample depth buffer values to store a set of per patch depth value information in a per patch depth buffer for use by the patch early depth test circuit when performing patch early depth tests when processing the render output, the per patch depth buffer storing for each of one or more patches representing respective different regions of the render output being generated, depth value information for the patch for use by the patch early depth test circuit when performing a patch early depth test for a primitive in respect of the patch.

Another embodiment of the technology described herein comprises a graphics processor, the graphics processor comprising:
a rasteriser that rasterises input primitives to generate graphics fragments to be processed, each graphics fragment having one or more sampling points associated with it; and
a renderer that processes fragments generated by the rasteriser to generate output fragment data;
wherein the rasteriser is configured to, when it receives a primitive to be rasterised, for each of one or more patches representing respective different regions of a render output to be generated, test the patch against the primitive to determine if the primitive at least partially covers the patch;
the graphics processor further comprising:
a patch early depth test circuit configured to perform an early depth test for a primitive in respect of a patch of a render output that the primitive has been found by the rasteriser at least partially to cover; and
a sample depth test circuit configured to perform depth tests for sampling positions that have been found to be covered by a primitive;
the graphics processor being further configured to, when processing primitives to generate a render output:
store a per patch depth buffer for the render output, that stores for each of one or more patches representing respective different regions of the render output being generated, depth value information for the patch for use by the patch early depth test circuit when performing a patch early depth test for a primitive in respect of the patch; and
store a per sample depth buffer for the render output, that stores a depth value for each of one or more sampling positions of the render output being generated for use by the sample depth test circuit when performing a depth test for a primitive in respect of a sampling position of the render output being generated;
the graphics processor being further configured to:
load per sample depth buffer values for a render output into a per sample depth buffer for use when processing the render output; and
use the loaded per sample depth buffer values to store a set of per patch depth value information in a per patch depth buffer for use by the patch early depth test circuit when performing patch early depth tests for primitives when processing the render output.

As will be appreciated by those skilled in the art, these embodiments of the technology described herein can and in an embodiment do include any one or more or all of the features of the technology described herein described herein. Thus, in particular, the per-patch depth buffer is in an embodiment of the form discussed above, and the process of constructing that buffer from the provided per-sample depth buffer is in an embodiment done in the manners discussed above.

Correspondingly, in these embodiments of the technology described herein, the per-sample depth buffer is in an embodiment a pre-generated (pre-computed) depth buffer that is provided to the graphics processor, e.g. from a non-graphics processor source (or from a previous operation of the graphics processor) (rather than being a partially completed per-sample depth buffer due to the graphics processor operation being interrupted).

Other arrangements and other sources of a per-sample depth buffer would, of course, be possible.

As well as the rasteriser, depth testers, and renderer, etc., the graphics processor and the graphics processing pipeline that it executes can and should include other processing circuits and stages that are normally present in graphics processors and processing pipelines, such as tile (and other) buffers, a writeback unit, a blender, etc.

The graphics processor may also comprise, and in an embodiment does also comprise, and/or is in communication with, one or more memories and/or memory devices that store the data described herein, such as the fragment data, the rendered fragment and output data, the patch and sampling position depth data (depth value data, etc.), and other state information etc., and/or that store software for performing the processes described herein. The graphics processor may also be in communication with a host microprocessor, and/or with a display for displaying images based on the data generated by the graphics processor.

The technology described herein can be used irrespective of the form of output that the graphics processor may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processor is being used to generate (e.g. in "render to texture" operation), or, indeed, where the output the graphics processor is being used to generate is any other form of data array.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuits, circuitry, processing logic, microprocessor arrangements, etc., that are operable to perform the various functions, etc., such as appropriately configured dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

The technology described herein is applicable to any suitable form or configuration of graphics processing system, graphics processor, and graphics processing pipeline. The technology described herein is particularly applicable to tile-based graphics processors and graphics processing systems. Thus, in an embodiment, the graphics processor is a tile-based graphics processor.

Subject to any hardware necessary to carry out the specific functions discussed above, the graphics processor can otherwise include any one or more or all of the usual functional units, circuits, etc., that graphics processors include.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising software code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a graphics processor 1 that executes a graphics processing pipeline and that may operate in accordance with the technology described herein.

FIG. 1 shows the main elements and pipeline stages of the graphics processor 1 that are relevant to the operation of the present embodiment. As will be appreciated by those skilled in the art there may be other elements of the graphics processor that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processor as shown in FIG. 1 may be implemented as desired and will accordingly comprise, e.g., appropriate circuits/circuitry and/or processing logic, etc., for performing the necessary operation and functions.

The graphics processor shown in FIG. 1 is a tile-based processor. The graphics processor 1 will thus produce tiles of a render output data array, such as an output frame to be generated (with each tile corresponding to a different, e.g. square, region of the overall output frame). (The technology described herein is equally applicable to other systems, such as immediate mode rendering systems.) The output data array may typically be an output frame intended for display on a display device, such as a screen or printer, but may also, for example, comprise a "render to texture" output of the graphics processor, etc.

FIG. 1 shows schematically the pipeline stages after the graphics primitives (polygons) 2 for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor 1.

As shown in FIG. 1, this part of the processing pipeline of the graphics processor 1 includes a number of processing stages, including a rasteriser 10 that includes a rasterisation circuit 3 and an early hierarchical ZS (depth and stencil) test circuit 4, an early ZS (depth and stencil) test circuit 9, a rendering circuit in the form of a programmable fragment shader 6, and a late ZS (depth and stencil) test circuit 7.

The graphics processor 1 also includes and/or has access to (is in communication with) appropriate (local) storage (buffers) for storing the data that it will use and/or generate, including a "per-patch" hierarchical depth and stencil buffer 11, a per-sampling position depth and stencil buffer 5, tile (colour) buffers 8, etc.

These buffers may be maintained in appropriate local storage, e.g. RAM, of or accessible to, the graphics processor, and may be stored in the same or different physical storage (e.g. RAM), as desired.

The graphics processor 1 also has access to (is in communication with) main memory 12, that may store the tile, depth, etc. data that the graphics processor generates, e.g. for later use.

The rasteriser 10 operates to rasterise primitives making up a render output (e.g. tile of an image to be displayed) into individual graphics fragments for processing. To do this, the rasteriser 10 receives graphics primitives 2 to be rendered, rasterises the primitives to sampling points and generates graphics fragments having appropriate positions (representing appropriate sampling positions) for rendering the primitives. In the present embodiment, each graphics fragment that is generated by the rasteriser 10 represents (has associated with it) plural (and normally four) sampling positions. (Other arrangements would, of course, be possible). Each graphics fragment has associated with it a coverage mask indicating which sampling points of the plural sampling positions that the fragment represents, it is actually being used to render (i.e. are actually covered by the primitive in question).

In the present embodiment, the rasteriser 10 is a hierarchical rasteriser that operates to iteratively test primitives against progressively smaller patches (regions) of the render output (target) area (and thus, correspondingly, patches of fragments), down to a minimum patch size corresponding, in the present embodiment, to a 2×2 group of fragments (i.e. to an array of sampling points that would be rasterised to a 2×2 group of fragments), discarding any patches that are not (at least in part) covered by the primitive. Each patch that is tested corresponds to a given set of fragments.

The rasterisation circuit 3 of the rasteriser 10 performs this render output patch testing. To do this, it starts with a large patch of the render output (the render target) area and tests the patch against the edges of the primitive in question to determine if the primitive at least partially covers any patch of a 2×2 set of smaller patches of the render output (the render target area) that the large patch is divided into (encompasses).

The edges of the primitive are represented by appropriate line (edge) equations that have been derived from the vertices of the primitive, and a grid of sampling points is derived for the patch (and for each patch) being tested. The patch sampling points are then used with the line equations representing the edges of the primitive in question to perform an edge test for the edges to determine if the patch is at least partially covered by the primitive.

In the present embodiment, the rasterisation circuit 3 determines that a patch of the render output is at least partially covered by a primitive if at least one of the following conditions is met: at least one edge of the patch is within the primitive; at least one edge of the patch is crossed by an edge of the primitive; at least one vertex of the primitive is within the patch; or at least one vertex of the primitive is on a patch edge and, if the vertex is on the patch edge, another vertex of the primitive is on another edge of the patch, or if the vertex is on a corner of the patch, another vertex is on the opposite corner or on one of the opposite edges of the patch.

Other arrangements would, of course, be possible.

If it is found that the large patch is not covered by the primitive at all, then the patch is not processed further in respect of the primitive in question (i.e. the entire patch is discarded for the primitive in question), and another (the next) large patch is tested against the primitive, and so on.

On the other hand, if a primitive is found to at least partially cover any of the smaller patches of the set of plural smaller patches of the render output that the large patch encompasses (is divided into) (i.e. the primitive is found to cover, at least in part, the large patch), the large patch is subdivided into its four smaller patches, and each covered such smaller patch ("sub-patch") is then tested against the primitive and processed in the same way (i.e. discarded, or sub-divided into a set of smaller patches, depending upon whether it is covered by the primitive or not).

This patch testing and discarding or subdivision is continued until the minimum patch size is reached.

The present embodiment supports four levels of subdivision (three sub-division iterations) and so starts with large patches corresponding to 16×16 fragments, which are then (if appropriate) subdivided into four 8×8 fragment patches. Each of those 8×8 fragment patches is then subdivided into respective 4×4 fragment patches (if appropriate). Finally, each 4×4 fragment patch is subdivided into respective 2×2 fragment patches (if appropriate). As in the present embodiment, a 2×2 fragment patch is the minimum patch size that is used, the (potential) subdivision process stops at this point. Other arrangements would, of course, be possible.

Figure 2:
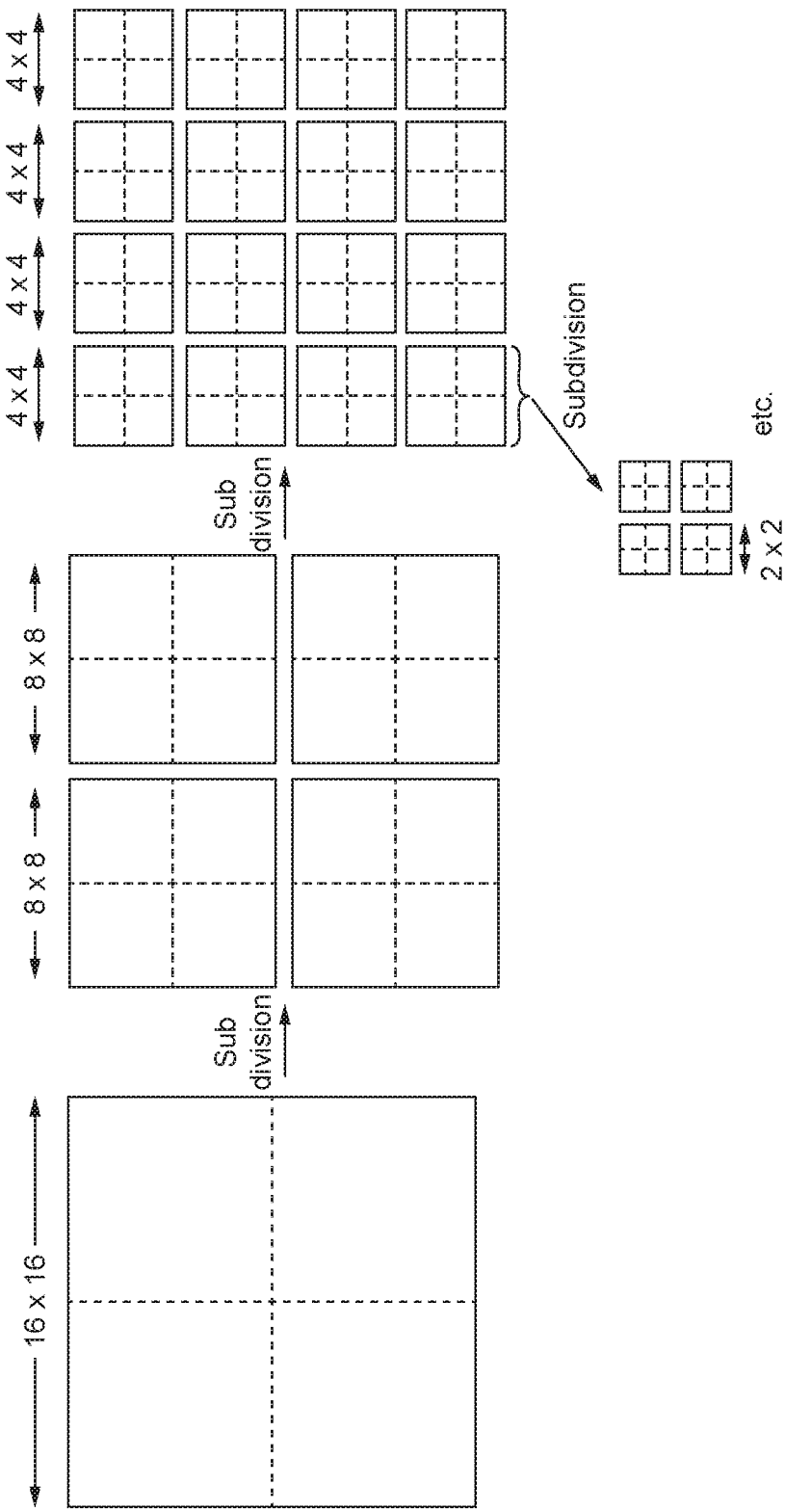
FIG. 2 illustrates the sub-division process that is used by the rasteriser in the described embodiment of the technology described herein.

FIG. 2 illustrates the subdivision process and shows a top level, 16×16 fragment, patch being progressively subdivided down to the minimum patch size of 2×2 fragments.

Once the minimum patch size has been reached (i.e. a patch of 2×2 fragments that covers, at least in part, the primitive has been identified), the rasterisation circuit 3 then tests the individual sampling points in that final patch to see if the sampling points are covered by the primitive. The rasteriser 10 then generates and outputs individual fragments for rendering corresponding to the sampling points found to be covered by the primitive (so four fragments if all the 2×2 fragments in the minimum size patch are at least partially covered by the primitive).

The rasteriser 10 also associates with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

In the present embodiment, the rasterisation process takes each largest-size patch to be tested against a primitive in turn, and sub-divides that patch and then tests the relevant smaller patches (sub-patches) within that largest-size patch, and so on, until all sub-division and testing for that largest-size patch has been completed.

Once this is done, the rasterisation process then moves on to the next first level, largest size patch, and tests that patch, and so on.

Other arrangements would, of course, be possible.

In the present embodiment, each primitive to be rasterised is tested against each first level (larger size) patch of the render output that falls at least partially within (is at least partially covered by) a bounding box generated for the primitive. Other arrangements would, of course, be possible.

Once all the highest level, largest size patches of the render output have been tested against a primitive (and subdivided or discarded, as appropriate), then the rasterisation process moves on to the next primitive for the render output being generated and so on.

The rasteriser 10 is configured in the present embodiment as a pipeline that can contain and process plural patches at the same time. The rasteriser 10 is also configured to be able to generate plural fragments at a time (simultaneously) (e.g. where a primitive is found to completely cover a patch of the render output that encompasses plural fragments (e.g. plural sampling points or sets of sampling points)). The fragments are still processed individually by the fragment processing parts of the pipeline, such as the renderer (fragment shader). Having the rasteriser produce plural fragments simultaneously helps to create back pressure to thereby keep the rendering pipeline "filled up" with fragments.

Other arrangements would, of course, be possible.

As shown in FIG. 1, the rasteriser 3 also has an early, per-patch, "hierarchical" depth (Z) and stencil testing circuit 4 associated with it. This hierarchical depth and stencil testing circuit 4 performs "early" depth and stencil tests on the patches generated by the rasterisation circuit 3 to see if those patches can be culled.

To do this, each patch of the render output generated by the rasterisation stage 3 is sent to the early hierarchical depth and stencil test circuit 4, which then performs a Z (depth) test on the patch of the render output to see if the patch can be discarded (culled) at this stage. At the same time, an early stencil test is carried out.

To do this, the early per-patch depth and stencil tester 4 uses per-patch depth and stencil values stored in the hierarchical per-patch depth and stencil buffer 11.

The per-patch hierarchical depth and stencil buffer 11 stores a set of depth value information for each patch that the render output could be divided into as part of the rasterisation process (essentially for each patch (size and position) that the rasterisation circuit 3 could generate for a tile that is being processed). (Thus in the present embodiments, for each patch as shown in FIG. 2.) The hierarchical per-patch early depth and stencil tester 4 then uses this stored depth value information to perform a depth test against the parts of a primitive being rasterised that are found to fall within a patch.

In the present embodiment, the depth value information that is stored for each patch comprises an indication of the range of depth values for the patch, in the form of a minimum depth value and a maximum depth value for the patch.

The depth value range that is stored for each patch is initially set to a default value, or to an expected depth value range for the patch if that can be determined. (In some arrangements, the possible depth values that primitives for a tile may have may be known in advance. This can then be used to populate the per-patch depth buffer 11 with ranges of expected depth values for the patches in question.) As is discussed further below, the stored patch depth value ranges are then updated as primitives being tested by the early per-patch hierarchical depth and stencil testing circuit 4 pass the depth tests.

A corresponding set of stencil values to be used for the stencil test is also stored for each patch.

When a patch is to be subjected to the early per-patch hierarchical depth and stencil test 4, the early per-patch hierarchical depth and stencil test 4 uses the stored patch depth and stencil test information stored in the hierarchical per-patch depth and stencil buffer 11 to perform the test. It also updates, if appropriate (essentially if the new primitive passes, at least in part, the depth and stencil tests), the stored depth and stencil test information for the patch in question. (The stencil test can also trigger an update for a "fail".)

(If the depth test fails for the primitive, then the existing depth value information for the patch in question is retained.)

To do a depth test for a patch, respective depth values for each corner of the patch are determined for the patch and for the primitive that is being tested, and then compared in a depth test.

Figure 3:
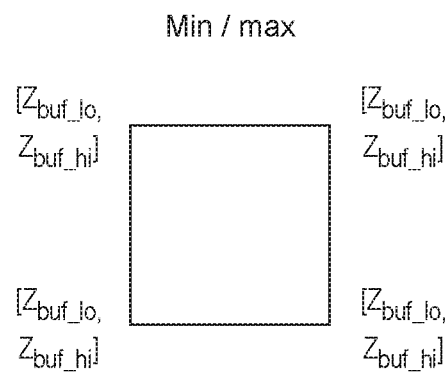
FIGS. 3 and 4 illustrate the determination of depth values in an embodiment of the technology described herein.

In the present embodiment, as the patch depth values are represented as minimum and maximum values, each corner of a patch is assumed to have the respective minimum and maximum depth value. FIG. 3 illustrates this and shows the respective depth values that will be derived for the corners of a patch.

Figure 4:
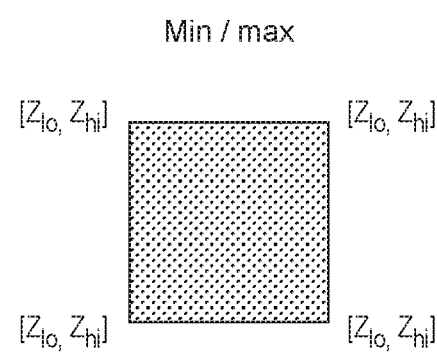

The depth values to use for a primitive for the test are derived using the depth function that is defined for the primitive in question. As in the present embodiment the depth values for a patch are in the form of minimum and maximum depth values, the depth function for a primitive is used to determine appropriate minimum and maximum depth values for the primitive at each corner of the patch. FIG. 4 illustrates this and shows the derivation of the depth values for a primitive for the corners of a patch. This process can also take account of any requirement that forces the primitive's depth values to other values, e.g. depending upon the depth value and stencil value source and whether the depth and stencil values for the primitive could be unknown.

Once the depth values for the patch and the primitive have been determined, they are then used to perform a depth test.

In the present embodiments, a min/max z-test that compares $[z_{lo}, z_{hi}]$ against $[z_{buf\_lo}, z_{buf\_hi}]$ to find out if it is greater than, less than or overlapping is performed:

zrange_greater_than $= z_{lo} > z_{buf\_hi}$ zrange_less_than $= z_{hi} < z_{buf\_lo}$ zrange_equal $= (z_{lo} == z_{hi} == z_{buf\_lo} == z_{buf\_hi})$ zrange_overlap=!(zrange_greater_than||zrange_less_than||zrange_equal)

The result of this test is then used to decide if the z test is passed, failed or was indeterminate; e.g. based on a depth test function defined for the render output and/or primitive, etc.

The results of the depth test will be one of: fully passed; partially passed; or not passed.

If all the tests are passed and the rasterizer mask is full, then the patch is fully covered, otherwise there will be partial coverage or no coverage. Overlapping ranges give partial coverage.

Other arrangements for the per-patch depth test would, of course, be possible.

A per-patch stencil test may correspondingly be carried out, if desired. Where a per-patch stencil test is to be performed, the stencil values for each corner of the patch for the primitive and for the patch in question can be derived in a corresponding fashion, based on how the stencil values are defined for the primitive and patch in question.

The early hierarchical depth and stencil tester 4 is configured to operate in an appropriately conservative manner.

In response to the depth and stencil tests, the buffers will be updated as appropriate, and the patch culled (the processing of the patch stopped) if stencil_fail or z_fail, or the patch kept if stencil_pass and z_pass.

This process will be repeated for each patch of the render output found to be at least partially covered by the primitive in question, and then for the next primitive for the render output processed, and so on.

Any patch that passes the per-patch early depth and stencil test is returned to the rasterisation circuit 3 for further subdivision into smaller patches ("sub-patches") as discussed above. Each (covered) "sub-patch" is then returned to the per-patch early depth and stencil tester 4 for testing, and so on, until the minimum patch size is reached.

Once the minimum patch size is reached (a patch of 2×2 fragments in this embodiment), the rasteriser 10 issues fragments that represent the patches (and thus sampling points) that pass the early hierarchical Z and stencil test 4 to the remainder of the graphics processing pipeline for processing.

Thus, in the present embodiment, the rasterisation process starts by testing a primitive against a first set of larger patches of the render output and progressively subdivides each larger patch of the set that is found to be at least partially covered by the primitive (and for which at least part of the primitive within the patch passes the early depth test (and any other early culling test)) into a set of smaller patches of the render output until a minimum patch size is reached. A fragment or fragments is then generated for rendering for patches found to be covered at least in part by the primitive in question (and for which at least part of the primitive within the patch passes the early depth test (and any other early culling test)).

The first part of this processing is to subject each fragment issued (output) by the rasteriser 10 to a per-sampling position early depth and stencil test in the per-sample early depth and stencil test circuit 9. This per-sample early depth and stencil test circuit 9 performs depth and stencil tests on the individual (covered) sampling positions associated with the fragments issued by the rasteriser 10 (i.e. at a per-sampling point resolution).

To do this, the per-sample early depth and stencil tester 9 uses per-sampling position depth and stencil values stored in the per-sample depth and stencil buffer 5. Thus, the depth and stencil buffer 5 stores an appropriate depth (Z) value and stencil value, respectively, for each sampling position that the buffer represents (essentially for each sampling position of the tile that is being processed). These values are stored in the depth and stencil buffer 5 when sampling points being tested by the per-sample early depth and stencil testing circuit 9 and the per-sample late depth and stencil testing circuit 7 pass the respective depth and stencil tests (the stencil values can be stored/updated when the tests are failed as well).

The early per-sample depth and stencil test 9 is configured to operate in an appropriately conservative manner.

Fragments that pass the early per-sample depth and stencil test 9 (i.e. fragments having at least one associated covered sampling position that passes the early per-sample depth and stencil test 9) are then sent onwards to the fragment shading circuit 6 (the renderer), as shown in FIG. 1.

(Fragments that fail the early per-sample depth and stencil test 9 are culled by the early per-sample depth and stencil test 9.)

The fragment shading circuit 6 performs the appropriate fragment processing (rendering) operations on the fragments it receives, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying blending, fogging or other operations to the fragments, etc., to generate the appropriate fragment data. In the present embodiment, the fragment shading circuit 6 is in the form of a programmable fragment shader that executes a shader pipeline, but other arrangements, such as the use also or instead of fixed function fragment shading units would be possible, if desired.

There is then a "late" per-sample depth and stencil test circuit 7, which (if it is to be performed, e.g. where a fragment did not undergo the early per-sample Z and stencil test) carries out, inter alia, an end of pipeline depth test on the shaded fragments (on the covered sampling points associated with shaded fragments) to determine whether the sampling points that a rendered fragment represents will overdraw the fragments whose values are currently stored in the tile buffer 5 (i.e. determines whether the fragment data for the fragments issuing from the fragment shading pipeline 6 should be stored in the tile buffers 8 (should replace or modify the fragment data in the tile buffer(s) of the fragments that have already been rendered)).

To do this, the late per-sample depth test circuit 7 compares the depth values of (associated with) the covered sampling positions of fragments issued from the fragment shading circuit 6 with the (per-sampling position) depth values stored in the per-sample depth buffer 5 for the sampling positions in question. The depth values for sampling points that pass the late per-sample depth test 7 are also written appropriately to the per-sample Z-buffer 5 to update it.

This late per-sample depth and stencil test 7 also carries out any necessary "late" alpha and/or stencil tests for the fragments.

The fragments that pass the late per-sample test 7 are then subjected to any remaining operations necessary on the fragments, such as blending with the framebuffer, dither etc. (not shown).

Finally, the output fragment data values are written to appropriate tile buffers (colour buffers) 8 that store an appropriate, e.g. colour, value for each sampling position that the buffers represent (in essence for each sampling position of the tile (render output) that is being processed).

Once each tile has been processed, its data is, e.g., exported from the tile buffers 8 to the main memory 12 (e.g. to a frame buffer in the main memory) for storage, and another tile is then processed, and so on, until sufficient tiles have been processed to generate the entire render output (e.g. frame (image) to be displayed).

Other arrangements for the fragment processing would, of course, be possible.

The present embodiments relate in particular to the operation of the graphics processor 1 when the processing of a tile that it is rendering is interrupted, such that it then needs to be resumed at a later date. This may be the case where, for example, tiles are rendered incrementally, for example using multiple passes per tile, with the multiple passes for a tile being interspersed with the processing of other tiles. This could arise where, for example, there is a constraint on the amount of data that can be generated for processing a tile, such that the processing of the tile will be started after only some but not all of the data needed to completely process the tile has been generated, with the processing of the tile then having to be paused once the initially generated data structures have been consumed, while further data for processing the tile is generated, with the processing of the tile being resumed once more data for processing for the tile has been generated, and so on. This may be repeated for plural tiles making up the overall render output, e.g. frame to be displayed.

Figure 5:
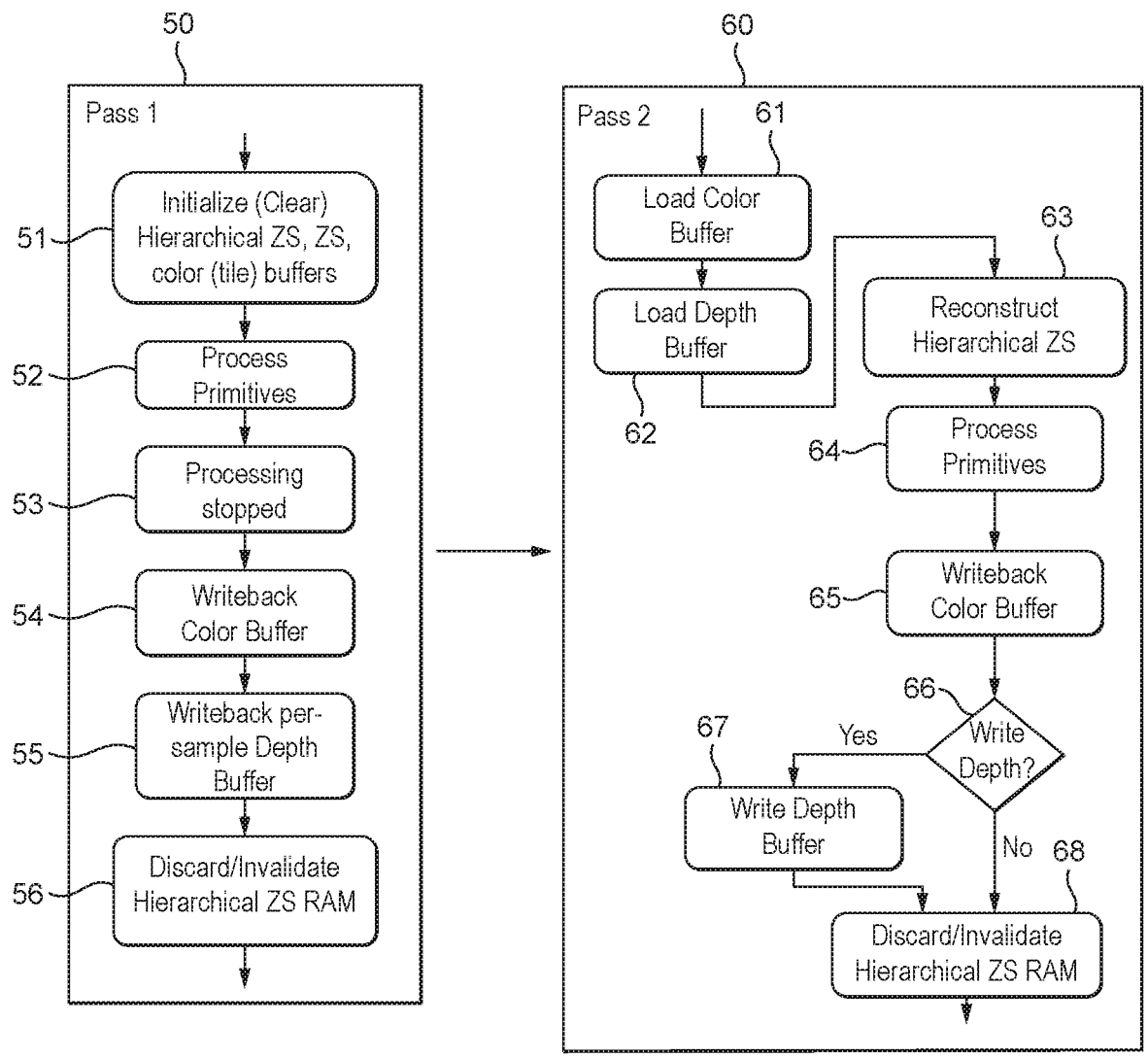
FIG. 5 shows the operation in an embodiment of the technology described herein.

FIG. 5 shows the operation in the present embodiment where the processing of a tile by the graphics processor illustrated in FIG. 1 is stopped before the processing for the tile has been completed, and then resumed to complete processing of the tile. FIG. 5 illustrates the situation where two processing passes are needed to complete the processing for the tile. However, it would be possible for more than two processing passes to be needed, and in that case the operation illustrated in FIG. 5 would be applied analogously to each respective (partial) processing pass for the tile.

FIG. 5 first shows the operation for a first processing pass 50 when the processing for a tile is started.

As shown in FIG. 5, in this first processing pass 50 to start processing a tile, all of the buffers, including the hierarchical per-patch depth and stencil buffer 11, the per-sample depth and stencil buffer 5, and the tile (colour) buffer 8 to be used when processing the tile are initialised (cleared), e.g. to a respective default value (step 51).

The processing of the primitives for the tile is then commenced (step 52). This processing is performed in the manner discussed above with reference to FIGS. 1 to 4.

It is then determined that the processing of the tile is to be stopped, e.g. because all the current data for processing the tile has been processed (consumed). In this case, because the processing the complete tile has not been done, the buffers for the tile will need to be available when the processing of the tile is resumed. To facilitate this, as shown in FIG. 5, the content of the tile (colour) buffer is written out to the memory 12 (step 54) so that it can be restored when processing of the tile is resumed.

Correspondingly, the content of the per-sample depth buffer 5 is written out to the memory 12 (step 55), so that again that per-sample depth buffer can be restored when the processing of the tile is resumed.

However, the content of the per-patch hierarchical depth and stencil buffer 11 is not written out to the memory 12, but rather that buffer is discarded (invalidated) (step 56).

Some time later, the graphics processor will resume processing of the tile that was interrupted, in a second processing pass 60. (In the meantime, the graphics processor may, e.g., switch to processing another tile or tiles of the render output, while further data for the tile whose processing was stopped is generated.)

When processing of the tile is resumed in the subsequent processing pass 60, it is necessary to restore the depth and stencil buffers and tile (colour) buffers to their state (their content) when the processing of the tile was stopped (so that processing of the tile can be correctly continued).

Thus, as shown in FIG. 5, in the subsequent processing pass 60, when processing of the tile is resumed, the previously stored content of the tile (colour) buffer is loaded from the memory into the tile (colour) buffers 8 (step 61).

Correspondingly, the previously stored content of the per-sample depth and stencil buffer 5 is loaded from the memory 12 into the per-sample depth and stencil buffer 5 (step 62).

As shown in FIG. 5, the per-sample depth buffer values that are loaded into the per-sample depth and stencil buffer 5 are also used to reconstruct (repopulate) the per-patch hierarchical depth and stencil buffer 11 (step 63). This then allows a "current" state of the per-patch hierarchical depth and stencil buffer 11 to be reconstructed for use in the second processing pass 60 when the processing of the tile is resumed, notwithstanding that the content of that buffer was discarded when processing of the tile was stopped (in the first processing pass 50).

To reconstruct the per-patch hierarchical depth and stencil buffer values, the per-sample depth values read-in to repopulate the per-sample depth and stencil buffer 5 (in step 62) are used to determine a minimum depth value and a maximum depth value for each patch that the per-patch hierarchical depth and stencil buffer 11 stores a depth value range for. The so-determined minimum and maximum depth values for each patch are then loaded appropriately into the per-patch hierarchical depth and stencil buffer 11, so as to repopulate that buffer for use when continuing processing of the tile.

In the present embodiment, as the per-patch depth buffer stores a maximum and a minimum depth value for each patch, the minimum depth value for a patch in the restored per-patch depth buffer is set to the minimum of the per-sample depth values that have been restored to the per-sample depth buffer for the sampling positions that fall within the patch, and, correspondingly, the maximum depth value for the patch is set to the maximum of the per-sample depth values that have been restored to the per-sample depth buffer for the sampling positions that fall within the patch.

To do this in the present embodiment, each per-sample depth value for a patch is read in in turn, using a DMA (direct memory access) process, and compared to the current maximum and minimum per-patch depth buffer values that have been set for the patch, with the current maximum and minimum patch depth values then being updated or not, based on the comparison, until all the sampling positions falling within the patch have been considered.

The per-sample depth values that are read in to repopulate the per-sample depth buffer are read-in on a patch-by-patch basis in an order that corresponds to the layout of the patches for which per-patch depth values are stored.

As the per-patch depth buffer is configured to store depth values for a hierarchical layout of patches (as discussed above), then in the present embodiment, the per-sample depth values that are read back in are used to set and populate the per-patch depth values for the lowest level of patches (for the smallest patches in the patch subdivision hierarchy), with the per-patch depth values for the higher levels (larger patches) in the patch hierarchy then being set based on the per-patch depth levels for the lower level patches that they encompass.

The per-sample depth values that are read in to repopulate the per-sample depth buffer are read-in in an order that corresponds to the layout of the patches for which per-patch depth values are stored, so as to facilitate repopulating the per-patch depth buffer in a more efficient manner. The reading in of the per-sample depth values traverses the sampling positions in the per-sample depth buffer in an order that matches the (patch) order for restoring the values in the per-patch depth buffer.

The restoration of the per-patch depth buffer also takes account of where sampling positions in a patch are not covered by a primitive. Thus, it can be indicated for which parts within a patch depth data exists for, and for which parts in the patch no depth data exists. The absence of any defined depth values for positions within the patch can be identified as desired, for example, based on whether the per-sample depth value for the position in the patch is indicated as not being covered by a primitive (e.g., and in an embodiment as having a particular depth "clear" value).

Thus, the depth values for the smallest (e.g. 2×2) patches, as well as coverage, are generated first, and then when considering the 4×4 patches in the next level of the hierarchy, the minimum of the four 2×2 patches within a 4×4 patch becomes the minimum of the 4×4 patch, and the maximum depth of the four 2×2 patches becomes the maximum depth for the 4×4 patch. Coverage data from the underlying 2×2 patches is also propagated up to the 4×4 layer. This is then repeated for each successive higher (larger patch) layer, as appropriate.

Once the tile (colour) buffer 8, the per-sample depth and stencil buffer 5, and the per-patch hierarchical depth and stencil buffer 11, have been restored in this way, then processing of primitives for the tile can be resumed (step 64). Again this is done in the manner discussed above.

In the arrangement shown in FIG. 5, it is assumed that the second processing pass 60 completes processing of the tile (i.e. processes all the primitives for the tile in question).

Thus when processing of the primitives have been completed, the tile (colour) buffer will be written out to the memory (step 65). It will also be determined whether the per-sample depth and stencil buffers should be written out to the memory (e.g. for further processing or later use) (step 66). If so, the per-sample depth and stencil buffer content is also written out to the memory (step 67).

Finally, the per-patch hierarchical depth and stencil buffer values are discarded (invalidated) as the processing of the tile has been completed and so those values will no longer be required (step 68).

The graphics processor can then commence processing another tile and/or a new frame, etc., as desired.

As discussed above, FIG. 5 illustrates the situation where the second pass 60 completes the processing of the tile. If that second pass 60 were, on the other hand, to be interrupted, before all the primitives for the tile have been processed, then that pass would write out the colour buffer and the per-sample depth buffer and discard the per-patch depth buffer as for the first pass 50, with processing of the tile then being resumed in a further pass corresponding to the second pass 60, and so on, until all the primitives for the tile have been processed.

Although the present embodiments have been described above with reference to the writing out and then restoring of the depth buffers when performing graphics processing, the process of constructing a per-patch depth buffer from a per-sample depth buffer in the manner of the present embodiments can also be used in other contexts where a per-patch depth buffer is required, such as in the case where a "pre-computed" depth buffer is supplied to the graphics processor (but without there being provided a corresponding "pre-computed" per-patch depth buffer), such as where the application that requires the graphics processing provides a pre-generated (pre-computed) depth buffer for use by the graphics processor.

It can be seen from the above that the technology described herein, in its embodiments at least, provides a mechanism for handling the interruption and resumption of processing of a render output when performing an early per-patch depth test, that facilitates performing of the per-patch early depth test in those circumstances, whilst reducing the memory bandwidth, storage, etc., that is required for that. This is achieved, in the embodiments of the technology described herein at least, by reconstructing the per-patch depth buffer values from previously saved per-sample depth buffer values, rather than storing out the per-patch depth buffer values themselves when processing of a render output is stopped. Similar arrangements can be used to generate a per-patch depth buffer from a supplied, pre-computed per-sample depth buffer.

Whilst the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processor, the graphics processor comprising:
   a rasteriser that rasterises input primitives to generate graphics fragments to be processed, each graphics fragment having one or more sampling points associated with it; and
   a renderer that processes fragments generated by the rasteriser to generate output fragment data;
   wherein the rasteriser, when it receives a primitive to be rasterised, for each of one or more patches representing respective different regions of a render output to be generated, tests the patch against the primitive to determine if the primitive at least partially covers the patch;
   the graphics processor further comprising:
      a patch early depth test circuit configured to perform an early depth test for a primitive in respect of a patch of a render output that the primitive has been found by the rasteriser at least partially to cover; and
      a sample depth test circuit configured to perform depth tests for sampling positions that have been found to be covered by a primitive;
   the method comprising, when processing primitives to generate a render output:
   storing a per patch depth buffer for the render output, that stores for each of one or more patches representing respective different regions of the render output being generated, depth value information for the patch for use by the patch early depth test circuit when performing a patch early depth test for a primitive in respect of the patch; and
   storing a per sample depth buffer for the render output, that stores a depth value for each of one or more sampling positions of the render output being generated for use by the sample depth test circuit when performing a depth test for a primitive in respect of a sampling position of the render output being generated;
   the method further comprising:
   the graphics processor stopping processing the render output, and when it does so:
      writing the per sample depth values in the per sample depth buffer to storage so that those values can be restored when continuing processing of the render output, but discarding the per patch depth value information in the per patch depth buffer;
   and
   the graphics processor resuming processing of the render output; and when it does so:
      loading the per sample depth buffer values written out to storage into a per sample depth buffer for use when continuing processing of the render output; and
      using the loaded per sample depth buffer values to store a set of per patch depth value information in a per patch depth buffer for use by the patch early depth test circuit when performing patch early depth tests for primitives when continuing processing of the render output.

2. The method of claim 1, wherein the rasteriser is a hierarchical rasteriser that operates to iteratively test primitives against progressively smaller patches of a render output down to a minimum patch size, and the patches of the render output that the early depth test is performed in respect of correspond to patches of the render output that the rasteriser tests for the rasterisation process.

3. A method of operating a graphics processor, the graphics processor comprising:
 a rasteriser that rasterises input primitives to generate graphics fragments to be processed, each graphics fragment having one or more sampling points associated with it; and
 a renderer that processes fragments generated by the rasteriser to generate output fragment data;
 wherein the rasteriser, when it receives a primitive to be rasterised, for each of one or more patches representing respective different regions of a render output to be generated, tests the patch against the primitive to determine if the primitive at least partially covers the patch;
 the graphics processor further comprising:
  a patch early depth test circuit configured to perform an early depth test for a primitive in respect of a patch of a render output that the primitive has been found by the rasteriser at least partially to cover; and
  a sample depth test circuit configured to perform depth tests for sampling positions that have been found to be covered by a primitive;
 the method comprising:
  the graphics processor:
   loading per sample depth buffer values into a per sample depth buffer for use when processing a render output, the per sample depth buffer storing a depth value for each of one or more sampling positions of the render output being generated for use by the sample depth test circuit when performing a depth test for a primitive in respect of a sampling position of the render output being generated; and
   using the loaded per sample depth buffer values to store a set of per patch depth value information in a per patch depth buffer for use by the patch early depth test circuit when performing patch early depth tests when processing the render output, the per patch depth buffer storing for each of one or more patches representing respective different regions of the render output being generated, depth value information for the patch for use by the patch early depth test circuit when performing a patch early depth test for a primitive in respect of the patch.

4. The method of claim 1, wherein the per-patch depth buffer stores a minimum depth value and a maximum depth value for each patch for which depth value information is stored.

5. The method of claim 4, wherein
 using the loaded per sample depth buffer values to store a set of per patch depth value information in a per patch depth buffer for use by the patch early depth test circuit when performing patch early depth tests for primitives when processing the render output comprises:
 setting the minimum depth value for a patch in the restored per-patch depth buffer to the minimum of the per-sample depth values that have been loaded to the per-sample depth buffer for the sampling positions that fall within the patch; and setting the maximum depth value for a patch to the maximum of the per-sample depth values that have been loaded to the per-sample depth buffer for the sampling positions that fall within the patch.

6. The method of claim 1, wherein loading the per sample depth buffer values into a per sample depth buffer for use when processing the render output comprises:
 loading the per-sample depth values using a Direct Memory Access process.

7. The method of claim 1, wherein loading the per sample depth buffer values into a per sample depth buffer for use when processing the render output comprises:
 loading the per-sample depth values in a patch-by-patch order.

8. The method of claim 1, wherein the per-patch depth buffer is configured to store depth values for a hierarchical layout of patches; and wherein
 using the loaded per sample depth buffer values to store a set of per patch depth value information in a per patch depth buffer for use by the patch early depth test circuit when performing patch early depth tests for primitives when processing the render output comprises:
 using the loaded per sample depth buffer values to store a set of per patch depth value information in a per patch depth buffer for use by the patch early depth test circuit when performing patch early depth tests for primitives when processing the render output to set the per-patch depth values for the smallest patches in the patch subdivision hierarchy; and
 setting the per-patch depth values for the larger patches in the patch hierarchy based on the per-patch depth values for the small patches that the larger patches respectively encompass.

9. The method of claim 1, wherein:
 the graphics processor stopping processing the render output is triggered by current data structures to be processed for the render output being processed being exhausted; and
 the graphics processor resuming processing the render output is triggered by there being new data structures containing new data for the render output that are ready to be processed.

10. The method of claim 1, wherein the render output to be generated comprises a tile of an overall output that is being generated by the graphics processor.

11. A graphics processor, the graphics processor comprising:
 a rasteriser that rasterises input primitives to generate graphics fragments to be processed, each graphics fragment having one or more sampling points associated with it; and
 a renderer that processes fragments generated by the rasteriser to generate output fragment data;
 wherein the rasteriser is configured to, when it receives a primitive to be rasterised, for each of one or more patches representing respective different regions of a render output to be generated, test the patch against the primitive to determine if the primitive at least partially covers the patch;
 the graphics processor further comprising:
  a patch early depth test circuit configured to perform an early depth test for a primitive in respect of a patch of a render output that the primitive has been found by the rasteriser at least partially to cover; and
  a sample depth test circuit configured to perform depth tests for sampling positions that have been found to be covered by a primitive;

the graphics processor being further configured to, when processing primitives to generate a render output:
store a per patch depth buffer for the render output, that stores for each of one or more patches representing respective different regions of the render output being generated, depth value information for the patch for use by the patch early depth test circuit when performing a patch early depth test for a primitive in respect of the patch; and
store a per sample depth buffer for the render output, that stores a depth value for each of one or more sampling positions of the render output being generated for use by the sample depth test circuit when performing a depth test for a primitive in respect of a sampling position of the render output being generated;
the graphics processor further configured to, when it stops processing a render output before the render output has been completed:
write the per sample depth values in the per sample depth buffer to storage so that those values can be restored when continuing processing of the render output, but discard the per patch depth value information in the per patch depth buffer; and
the graphics processor further configured to, when it resumes processing of a previously stopped render output:
load the per sample depth buffer values for the render output written out to storage into a per sample depth buffer for use when continuing processing of the render output; and
use the loaded per sample depth buffer values to store a set of per patch depth value information in a per patch depth buffer for use by the patch early depth test circuit when performing patch early depth tests for primitives when continuing processing of the render output.

12. The graphics processor of claim 11, wherein the rasteriser is a hierarchical rasteriser that operates to iteratively test primitives against progressively smaller patches of a render output down to a minimum patch size, and the patches of the render output that the early depth test is performed in respect of correspond to patches of the render output that the rasteriser tests for the rasterisation process.

13. A graphics processor, the graphics processor comprising:
a rasteriser that rasterises input primitives to generate graphics fragments to be processed, each graphics fragment having one or more sampling points associated with it; and
a renderer that processes fragments generated by the rasteriser to generate output fragment data;
wherein the rasteriser is configured to, when it receives a primitive to be rasterised, for each of one or more patches representing respective different regions of a render output to be generated, test the patch against the primitive to determine if the primitive at least partially covers the patch;
the graphics processor further comprising:
a patch early depth test circuit configured to perform an early depth test for a primitive in respect of a patch of a render output that the primitive has been found by the rasteriser at least partially to cover; and
a sample depth test circuit configured to perform depth tests for sampling positions that have been found to be covered by a primitive;
the graphics processor being further configured to, when processing primitives to generate a render output:
store a per patch depth buffer for the render output, that stores for each of one or more patches representing respective different regions of the render output being generated, depth value information for the patch for use by the patch early depth test circuit when performing a patch early depth test for a primitive in respect of the patch; and
store a per sample depth buffer for the render output, that stores a depth value for each of one or more sampling positions of the render output being generated for use by the sample depth test circuit when performing a depth test for a primitive in respect of a sampling position of the render output being generated;
the graphics processor being further configured to:
load per sample depth buffer values for a render output into a per sample depth buffer for use when processing the render output; and
use the loaded per sample depth buffer values to store a set of per patch depth value information in a per patch depth buffer for use by the patch early depth test circuit when performing patch early depth tests for primitives when processing the render output.

14. The graphics processor of claim 11, wherein the per-patch depth buffer stores a minimum depth value and a maximum depth value for each patch for which depth value information is stored.

15. The graphics processor of claim 14, wherein the graphics processor is configured to use the loaded per sample depth buffer values to store a set of per patch depth value information in a per patch depth buffer for use by the patch early depth test circuit when performing patch early depth tests for primitives when processing the render output by:
setting the minimum depth value for a patch in the restored per-patch depth buffer to the minimum of the per-sample depth values that have been loaded to the per-sample depth buffer for the sampling positions that fall within the patch; and setting the maximum depth value for a patch to the maximum of the per-sample depth values that have been loaded to the per-sample depth buffer for the sampling positions that fall within the patch.

16. The graphics processor of claim 11, wherein the graphics processor is configured to load the per sample depth buffer values into a per sample depth buffer for use when processing the render output by:
loading the per-sample depth values using a Direct Memory Access process.

17. The graphics processor of claim 11, wherein the graphics processor is configured to load the per sample depth buffer values into a per sample depth buffer for use when processing the render output in a patch-by-patch order.

18. The graphics processor of claim 11, wherein:
the per-patch depth buffer is configured to store depth values for a hierarchical layout of patches; and
the graphics processor is configured to use the loaded per sample depth buffer values to store a set of per patch depth value information in a per patch depth buffer for use by the patch early depth test circuit when performing patch early depth tests for primitives when processing the render output by:
using the loaded per sample depth buffer values to store a set of per patch depth value information in a per patch depth buffer for use by the patch early depth test circuit when performing patch early depth tests for primitives when processing the render output to set the per-patch depth values for the smallest patches in the patch subdivision hierarchy; and setting the per-patch depth values for the larger patches in the patch hierarchy based on the per-patch depth values for the small patches that the larger patches respectively encompass.

19. The graphics processor of claim 11, wherein:

the graphics processor stopping processing the render output is triggered by current data structures to be processed for the render output being processed being exhausted; and the graphics processor resuming processing the render output is triggered by there being new data structures containing new data for the render output that are ready to be processed.

20. The graphics processor of claim 11, wherein the render output to be generated comprises a tile of an overall output that is being generated by the graphics processor.

21. A non-transitory computer readable storage medium storing computer software code which when executing on a processor performs a method of operating a graphics processor, the graphics processor comprising:

a rasteriser that rasterises input primitives to generate graphics fragments to be processed, each graphics fragment having one or more sampling points associated with it; and a renderer that processes fragments generated by the rasteriser to generate output fragment data;

wherein the rasteriser, when it receives a primitive to be rasterised, for each of one or more patches representing respective different regions of a render output to be generated, tests the patch against the primitive to determine if the primitive at least partially covers the patch;

the graphics processor further comprising:

a patch early depth test circuit configured to perform an early depth test for a primitive in respect of a patch of a render output that the primitive has been found by the rasteriser at least partially to cover; and a sample depth test circuit configured to perform depth tests for sampling positions that have been found to be covered by a primitive;

the method comprising:

the graphics processor:

loading per sample depth buffer values into a per sample depth buffer for use when processing a render output, the per sample depth buffer storing a depth value for each of one or more sampling positions of the render output being generated for use by the sample depth test circuit when performing a depth test for a primitive in respect of a sampling position of the render output being generated; and using the loaded per sample depth buffer values to store a set of per patch depth value information in a per patch depth buffer for use by the patch early depth test circuit when performing patch early depth tests when processing the render output, the per patch depth buffer storing for each of one or more patches representing respective different regions of the render output being generated, depth value information for the patch for use by the patch early depth test circuit when performing a patch early depth test for a primitive in respect of the patch.

* * * * *